United States Patent
Cho et al.

(10) Patent No.: US 12,423,588 B2
(45) Date of Patent: Sep. 23, 2025

(54) OPTIMIZATION TECHNIQUE FOR FORMING DNN CAPABLE OF PERFORMING REAL-TIME INFERENCE IN MOBILE ENVIRONMENT

(71) Applicant: NAVER CORPORATION, Seongnam-si (KR)

(72) Inventors: Sungtak Cho, Seongnam-si (KR); Young Soo Lee, Seongnam-si (KR); Dongju Lee, Seongnam-si (KR); SungHo Kim, Seongnam-si (KR); Joon-kee Chang, Seongnam-si (KR)

(73) Assignee: NAVER CORPORATION, Seongnam-si (KR)

( * ) Notice: Subject to any disclaimer, the term of this patent is extended or adjusted under 35 U.S.C. 154(b) by 1138 days.

(21) Appl. No.: 17/112,069

(22) Filed: Dec. 4, 2020

(65) Prior Publication Data

US 2021/0089914 A1    Mar. 25, 2021

Related U.S. Application Data

(63) Continuation of application No. PCT/KR2019/006746, filed on Jun. 4, 2019.

(30) Foreign Application Priority Data

Jun. 5, 2018    (KR) .................... 10-2018-0064897

(51) Int. Cl.
*G06N 3/08*    (2023.01)
*G06N 3/04*    (2023.01)
(Continued)

(52) U.S. Cl.
CPC ............. *G06N 3/096* (2023.01); *G06N 3/04* (2013.01); *G06N 3/08* (2013.01); *G06V 10/778* (2022.01)

(58) Field of Classification Search
CPC .. G06N 3/08; G06N 3/04; G06N 3/02; G06N 3/096; G06V 10/778
See application file for complete search history.

(56) References Cited

U.S. PATENT DOCUMENTS 9,576,351 B1 *    2/2017    Barzel .................... G06T 11/60
9,922,432 B1 *    3/2018    Risser .................... G06T 11/001
(Continued)

FOREIGN PATENT DOCUMENTS

KR    1020150079064 A    7/2015
KR    1020170034258 A    3/2017
(Continued)

OTHER PUBLICATIONS

J. Yim, D. Joo, J. Bae and J. Kim, "A Gift from Knowledge Distillation: Fast Optimization, Network Minimization and Transfer Learning," 2017 IEEE Conference on Computer Vision and Pattern Recognition (CVPR), Honolulu, HI, USA, 2017, pp. 7130-7138, doi: 10.1109/CVPR.2017.754. (Year: 2017).*
(Continued)

*Primary Examiner* — Andrew L Tank
(74) *Attorney, Agent, or Firm* — Greer Burns & Crain Ltd.

(57) ABSTRACT

A system includes at least one processor having a learning part for learning a deep neural network (DNN)-based style transfer model by using an image of a specific style to be learned, the style transfer model being a DNN model having an architecture in which the number of deep layers is reduced through transfer learning using a previously learned result.

13 Claims, 8 Drawing Sheets

(51) Int. Cl.
*G06N 3/096* (2023.01)
*G06V 10/778* (2022.01)

(56) References Cited

U.S. PATENT DOCUMENTS

| | | | | |
|---|---|---|---|---|
| 10,664,963 | B1* | 5/2020 | Rossi | G06V 10/82 |
| 10,789,694 | B1* | 9/2020 | Rymkowski | G06N 3/045 |
| 10,984,286 | B2* | 4/2021 | Dundar | G06V 10/955 |
| 2015/0324686 | A1* | 11/2015 | Julian | G06N 3/08 706/25 |
| 2016/0217369 | A1* | 7/2016 | Annapureddy | G06N 3/082 |
| 2017/0024641 | A1* | 1/2017 | Wierzynski | G06N 3/045 |
| 2017/0083829 | A1* | 3/2017 | Kang | G06N 3/045 |
| 2018/0336465 | A1* | 11/2018 | Kim | G06N 3/08 |
| 2018/0357800 | A1* | 12/2018 | Oxholm | G06T 11/001 |
| 2018/0373999 | A1* | 12/2018 | Xu | G06V 20/49 |
| 2019/0138838 | A1* | 5/2019 | Liu | G06T 5/70 |
| 2019/0220746 | A1* | 7/2019 | Liu | G06N 3/084 |
| 2019/0362522 | A1* | 11/2019 | Han | A61N 5/1039 |

FOREIGN PATENT DOCUMENTS

| | | | | |
|---|---|---|---|---|
| KR | 1020170106338 A | | 9/2017 | |
| KR | 1020180034395 A | | 4/2018 | |
| WO | WO-2018075927 A1 | * | 4/2018 | G06F 18/214 |

OTHER PUBLICATIONS

X. Huang and S. Belongie, "Arbitrary Style Transfer in Real-Time with Adaptive Instance Normalization," 2017 IEEE International Conference on Computer Vision (ICCV), Venice, Italy, 2017, pp. 1510-1519, doi: 10.1109/ICCV.2017.167. (Year: 2017).*
Ahn, Il Jun, and Woo Hyun Nam. "Texture enhancement via high-resolution style transfer for single-image super-resolution." arXiv preprint arXiv: 1612.00085 (2016). (Year: 2016).*
Anderson, Alexander G., et al. "Deepmovie: Using optical flow and deep neural networks to stylize movies." arXiv preprint arXiv: 1605.08153 (2016). (Year: 2016).*
D. Chen, L. Yuan, J. Liao, N. Yu and G. Hua, "StyleBank: An Explicit Representation for Neural Image Style Transfer," 2017 IEEE Conference on Computer Vision and Pattern Recognition (CVPR), Honolulu, HI, USA, 2017, pp. 2770-2779, doi: 10.1109/CVPR.2017.296. (Year: 2017).*
P. Daru, S. Gada, M. Chheda and P. Raut, "Neural Style Transfer to Design Drapes," 2017 IEEE International Conference on Computational Intelligence and Computing Research (ICCIC), Coimbatore, India, 2017, pp. 1-6, doi: 10.1109/ICCIC.2017.8524424. (Year: 2017).*
L. A. Gatys, A. S. Ecker and M. Bethge, "Image Style Transfer Using Convolutional Neural Networks," 2016 IEEE Conference on Computer Vision and Pattern Recognition (CVPR), Las Vegas, NV, USA, 2016, pp. 2414-2423, doi: 10.1109/CVPR.2016.265. (Year: 2016).*
Hinton, Geoffrey, Oriol Vinyals, and Jeff Dean. "Distilling the knowledge in a neural network." arXiv preprint arXiv: 1503.02531 (2015). (Year: 2015).*
F. Iandola et al., "Keynote: small neural nets are beautiful: enabling embedded systems with small deep-neural-network architectures," 2017 International Conference on Hardware/Software Codesign and System Synthesis (CODES+ISSS), Seoul, Korea (South), 2017, pp. 1-10, doi: 10.1145/3125502.3125606. (Year: 2017).*
Johnson, Justin, Alexandre Alahi, and Li Fei-Fei. "Perceptual Losses for Real-Time Style Transfer and Super-Resolution." arXiv preprint arXiv:1603.08155 (2016). (Year: 2016).*
A. Mikolajczyk and M. Grochowski, "Data augmentation for improving deep learning in image classification problem," 2018 International Interdisciplinary PhD Workshop (IIPhDW), Świnoujście, Poland, 2018, pp. 117-122, doi: 10.1109/IIPHDW.2018.8388338. (Year: 2018).*
Nam H, Kim HE. Batch-Instance Normalization for Adaptively Style-Invariant Neural Networks. arXiv preprint arXiv:1805.07925. May 21, 2018. (Year: 2018).*
Semmo, Amir, Tobias Isenberg, and Jurgen Dollner. "Neural style transfer: A paradigm shift for image-based artistic rendering?." Proceedings of the symposium on non-photorealistic animation and rendering. 2017. (Year: 2017).*
H.-C. Shin et al., "Deep Convolutional Neural Networks for Computer-Aided Detection: CNN Architectures, Dataset Characteristics and Transfer Learning," in IEEE Transactions on Medical Imaging, vol. 35, No. 5, pp. 1285-1298, May 2016, doi: 10.1109/TMI.2016.2528162. (Year: 2016).*
V. Sze, Y.-H. Chen, T.-J. Yang and J. S. Emer, "Efficient Processing of Deep Neural Networks: A Tutorial and Survey," in Proceedings of the IEEE, vol. 105, No. 12, pp. 2295-2329, Dec. 2017, doi: 10.1109/JPROC.2017.2761740. (Year: 2017).*
Ulyanov, Dmitry, Andrea Vedaldi, and Victor Lempitsky. "Instance normalization: The missing ingredient for fast stylization." arXiv preprint arXiv:1607.08022 (2016). (Year: 2016).*
Zhang, Yexun, et al. "Separating Style and Content for Generalized Style Transfer." arXiv preprint arXiv:1711.06454 (2017). (Year: 2017).*
Huang, Zehao, and Naiyan Wang. "Like what you like: Knowledge distill via neuron selectivity transfer." arXiv preprint arXiv: 1707.01219 (2017). (Year: 2017).*
Junho Yim et al.; "A Gift From Knowledge Distillation: Fast Optimization, Network Minimization and Transfer Learning"; 2017; pp. 4133-4138.
Leon A. Gatys et al.; "A Neural Algorithm of Artistic Style"; Sep. 2015; pp. 1-16.
Hyungjun Lim et al.; "Sound event classification using deep neural network based transfer learning"; The Journal of the Acoustical Society of Korea vol. 35, No. 2 (2016), pp. 143-148, 144-145.
ISR issued in Int'l. Application No. PCT/KR2019/006736, mailed Sep. 17, 2019 (with translation).

* cited by examiner

Correlation between filters

<Original Model>

|  | Convolution Info | | | |
| --- | --- | --- | --- | --- |
|  | Kernel | Kernel | InputChannel | OutoutChannel |
| Conv1 | 9 | 9 | 3 | 32 |
| Conv2 | 3 | 3 | 32 | 64 |
| Conv3 | 3 | 3 | 64 | 128 |
| Residual | 3 | 3 | 128 | 128 |
| Deconv1 | 3 | 3 | 128 | 64 |
| Deconv2 | 3 | 3 | 64 | 32 |
| Deconv3 | 9 | 9 | 32 | 3 |

<Optimized Model>

|  | Convolution Info | | | |
| --- | --- | --- | --- | --- |
|  | Kernel | Kernel | InputChannel | OutoutChannel |
| Conv1 | 3 | 3 | 3 | 8 |
| Conv2 | 3 | 3 | 8 | 16 |
| Conv3 | 3 | 3 | 16 | 32 |
| Residual | 3 | 3 | 32 | 32 |
| Deconv1 | 3 | 3 | 32 | 16 |
| Deconv2 | 3 | 3 | 16 | 8 |
| Deconv3 | 3 | 3 | 8 | 3 |

OPTIMIZATION TECHNIQUE FOR FORMING DNN CAPABLE OF PERFORMING REAL-TIME INFERENCE IN MOBILE ENVIRONMENT

CROSS-REFERENCE TO RELATED APPLICATIONS

This is a continuation application of International Application No. PCT/KR2019/006746, filed Jun. 4, 2019, which claims the benefit of Korean Patent Application No. 10-2018-0064897, filed Jun. 5, 2018.

BACKGROUND OF THE INVENTION

Field of Invention

The following disclosure relates to a technique that optimizes a deep neural network (DNN) model.

Description of Related Art

In general, deep learning is defined as a set of machine learning algorithms that attempt to achieve a high level of abstraction through a combination of several nonlinear transformations, and is a field of machine learning that teaches computers to think about human thinking in a large framework.

Many studies have been conducted to express any data in a form that can be understood by a computer (for example, a tool that represents pixel information as a column vector in the case of an image) and apply it to learning.

Various deep learning techniques such as deep neural networks, convolutional neural networks, and recurrent neural networks are applied to fields such as computer vision, speech recognition, natural language processing, and speech/signal processing.

For example, Korean Laid-Open Patent Publication No. 10-2015-0079064 (published on 8 Jul. 2015) discloses a technology in which an input of a still image the user wants to save is received, the context of the image is understood through deep learning, and physical information, semantic information, and metadata are inferred and automatically tagged.

BRIEF SUMMARY OF THE INVENTION

The present disclosure provides a deep neural network (DNN) optimization model capable of performing real-time inference in a mobile environment.

One exemplary embodiment of the present disclosure provides a system that is implemented by a computer, the system comprising at least one processor implemented so as to execute a computer-readable command, wherein the at least one processor comprises a learning part for learning a deep neural network (DNN)-based style transfer model by using an image of a specific style to be learned, and the style transfer model is a DNN model having an architecture in which the number of deep layers is reduced through transfer learning using a previously learned result.

According to one aspect, the style transfer model may be a DNN model that performs learning through transfer learning from other DNN models.

According to another aspect, the style transfer model may be a DNN model that performs transfer learning by obtaining an intermediate learning result from a previously trained DNN model that has learned an image of a style similar to the specific style.

According to yet another aspect, the style transfer model may be a DNN model consisting of some layers of a previously trained DNN model that has learned an image of a style similar to the specific style.

According to a further aspect, the at least one processor may measure the similarities between the DNN models by extracting a feature map from some layers of the DNN models.

According to a further aspect, the style transfer model may be a DNN model having an architecture in which the feature size of at least one layer is reduced.

According to a further aspect, the style transfer model may be a DNN model having an architecture in which an instance normalization operator is added to a residual layer.

According to a further aspect, the residual layer may consist of a convolution operator, an instance normalization operator, an activation function, a convolution operator, and an instance normalization operator in the order mentioned.

According to a further aspect, the last residual layer may comprise an architecture for scaling down the resultant value of an operation of the preceding layer.

Another exemplary embodiment of the present disclosure provides a method that is implemented by a computer, the method comprising: learning a deep neural network (DNN)-based style transfer model by using an image of a specific style to be learned; and providing a resulting image by applying the specific style to an input image through the style transfer model, wherein the style transfer model is a DNN model having an architecture in which the number of deep layers is reduced through transfer learning using a previously learned result.

Yet another exemplary embodiment of the present disclosure provides a computer program connected to a computer and stored in a computer-readable recording medium to execute the above method.

A further exemplary embodiment of the present disclosure provides a computer-readable recording medium with a program recorded thereon for executing the above method.

According to embodiments of the present disclosure, there is provided a deep neural network (DNN) optimization model capable of performing real-time inference in a mobile environment.

DETAILED DESCRIPTION OF THE INVENTION

Hereinafter, exemplary embodiments of the present disclosure will be described in detail with reference to the accompanying drawings.

The exemplary embodiments of the present disclosure relate to a technique for optimizing a deep neural network (DNN) model.

The exemplary embodiments, including those specifically disclosed herein, provide a DNN optimization model capable of performing real-time inference in a mobile environment, whereby substantial advantages can be achieved in terms of structure simplification, computation reduction, efficiency, accuracy, speed, cost saving, etc.

Figure 1:
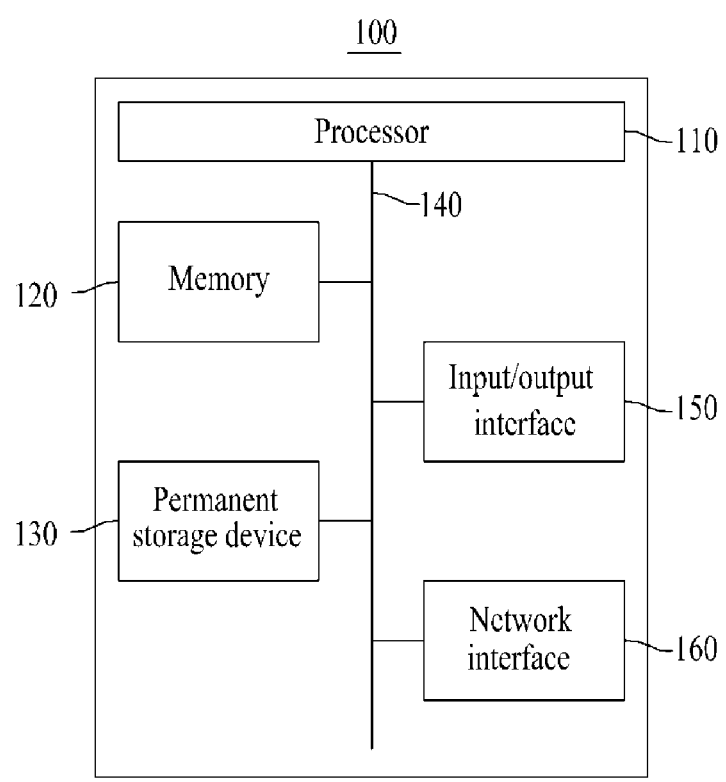
FIG. 1 is a block diagram for illustrating an example of an internal configuration of a computer system according to an exemplary embodiment of the present disclosure.

FIG. 1 is a block diagram for illustrating an example of an internal configuration of a computer system according to an exemplary embodiment of the present disclosure. For example, a deep learning system according to exemplary embodiments of the present disclosure may be implemented through a computer system 100 of FIG. 1. As illustrated in FIG. 1, the computer system 100 is a component for executing a deep learning-based method for performing real-time inference, and may comprise a processor 110, memory 120, a permanent storage device 130, a bus 140, an input/output interface 150, and a network interface 160.

The processor 110 is a component for performing deep learning-based real-time inference, and may include a certain device capable of processing a sequence of instructions or may be part of that device. The processor 110 may include, for example, a computer processor or a processor and/or digital processor within a mobile device or other electronic device. The processor 110 may be included, for example, in a server computing device, a server computer, a series of server computers, a server farm, a cloud computer, a content platform, etc. The processor 110 may be connected to the memory 120 via the bus 140.

The memory 120 may include volatile memory or permanent memory, virtual or other memory for storing information used or outputted by the computer system 100. The memory 120 may include, for example, random access memory (RAM) and/or dynamic RAM (DRAM). The memory 120 may be used to store certain information, such as status information of the computer system 100. The memory 120 also may be used to store instructions of the computer system 100, including instructions for performing deep learning-based real-time inference, for example. The computer system 100 may comprise one or more processors 110, if necessary or in a proper case.

The bus 140 may comprise a communication-based structure that enables an interaction between various components of the computer system 100. The bus 140 may carry data between the components of the computer system 100, for example, between the processor 110 and the memory 120. The bus 140 may comprise wireless and/or wired communication media between the components of the computer system 100, and may comprise parallel, serial, and other topology arrays.

The permanent storage device 130 may include memory used by the computer system 100 or other components for storing data for a predetermined extended period (e.g., compared to the memory 120). The permanent storage device 130 may include non-volatile main memory used by the processor 110 within the computer system 100. For example, the permanent storage device 130 may include a flash memory, a hard disk, an optical disk, or other computer-readable media.

The input/output interface 150 may include interfaces for a keyboard, a mouse, a voice command input, a display, or other input or output devices. Configuration commands and/or inputs for deep learning-based real-time inference may be received over the input/output interface 150.

The network interface 160 may include one or more interfaces for networks, such as a short-range network or the internet. The network interface 160 may include interfaces for wired or wireless connections. Configuration commands and/or inputs for deep learning-based real-time inference may be received over the network interface 160.

Also, in other embodiments, the computer system 100 may comprise more components than the components of FIG. 1. For example, the computer system 100 may be implemented to include other components such as a transceiver, a global positioning system (GPS) module, a camera, various kinds of sensors, a database, etc.

The present disclosure provides a DNN optimization model capable of performing real-time inference in a mobile environment.

Deep learning is used in various technical fields including audio signal processing, natural language processing, vision processing, etc. For example, a style transfer filter is a deep learning-based image filter, which provides the effect of applying the style of a given artwork, such as that of Van Gogh or Picasso, to an image.

Figure 2:
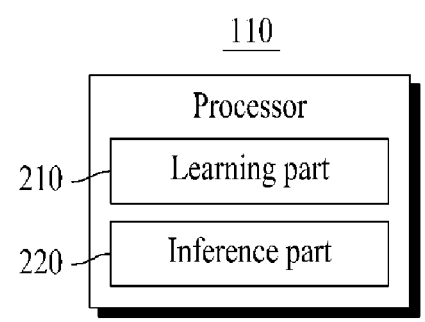
FIG. 2 is a block diagram depicting an example of components that may be included in a processor of a computer system according to an exemplary embodiment of the present disclosure.
Figure 3:
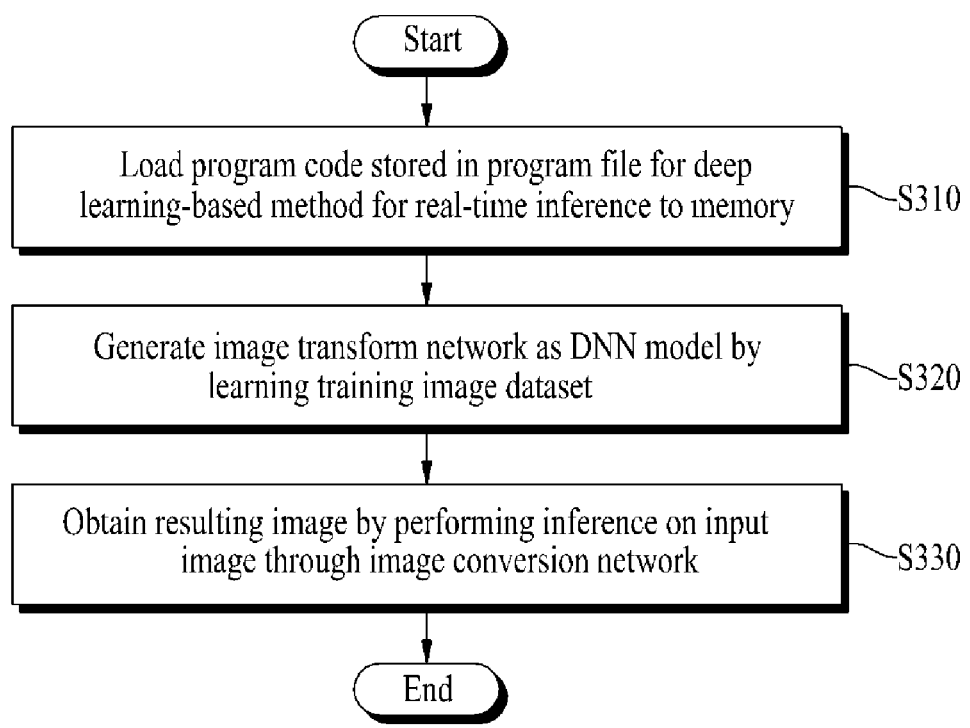
FIG. 3 is a flowchart of a deep learning-based method for performing real-time inference that can be implemented by a computer system according to an exemplary embodiment of the present disclosure.

FIG. 2 is a block diagram depicting an example of components that may be included in the processor 110 of the computer system 100 according to an exemplary embodiment of the present disclosure. FIG. 3 is a flowchart describing an example of a deep learning-based method for performing real-time inference that may be implemented by the computer system 100 according to an exemplary embodiment of the present disclosure.

As illustrated in FIG. 2, the processor 110 may comprise a learning part 210 and an inference part 220. These components of the processor 110 may be representations of different functions performed by the processor 110 in accordance with a control command provided by at least one program code. For example, the learning part 210 may be used as a functional representation of the processor 110 that controls the computer system 100 to perform image learning. The processor 110 and the components of the processor 110 may perform steps S310 through S330 included in the deep learning-based method for performing real-time inference of FIG. 3. For example, the processor 110 and the components of the processor 110 may be configured to execute instructions according to a code of an operating system included in the memory 120 and the at least one program code mentioned above. Here, the at least one program code may correspond to a code of a program configured to process the deep learning-based method for performing real-time inference.

The deep learning-based method for performing real-time inference may not necessarily be performed in the illustrated sequence. Some of the steps may be omitted, or an additional process may be further included.

In step S310, the processor 110 may load a program code stored in a program file for the deep learning-based method for performing real-time inference to the memory 120. For example, the program file for the deep learning-based method for performing real-time inference may be stored in the permanent storage device 130 explained with reference to FIG. 1, and the processor 110 may control the computer system 110 to load a program code from the program file stored in the permanent storage device 130 to the memory 120 via a bus. At this point, the processor 110 and the learning part 210 and the inference part 220 included in the processor 110 each may be different functional representations of the processor 110 to perform subsequent steps S320 and S330 by executing a command of a corresponding portion of the program code loaded to the memory 120. To perform steps S320 and S330, the processor 110 and the components of the processor 110 may directly process an operation or control the computer system 100, in response to a control command.

In step S320, the learning part 210 may generate an image transform network as a DNN model by learning a training image dataset. For a style transfer service, learning may be performed through a learning module by using a style image and a style weight as input data. In other words, the learning part 210 may learn a style transfer model based on an image of a style to be serviced. In this case, the image of the style may be learned by using a DNN model. The training image dataset may consist of answer images for each style which is a transfer filter to be serviced. An image transform network may be generated by performing learning of the answer images. By applying an image x to the image transform network, a resulting image y of a specific style may be generated. At this point, the learning part 210 may generate the image transform network by using a DNN model that is used often to extract image features required for learning.

In step S330, when the user feeds an input image whose style they want to transfer and selects a style model they want, the inference part 220 may obtain a resulting image with the style applied to it by performing inference on the input image through an image transform network of the selected style model. The inference part 220 may provide a new image as a result, with the style the user wants applied to it, by passing the input image through the image transform network generated through a learning model of the learning part 210.

Currently known DNN models are available for a variety of tasks such as classification, detection, and segmentation, and most of the tasks are done through DNN model learning on a high-performance GPU server.

The known DNN models are problematic in that their architectures are designed in such a complex manner that it is difficult to perform inference in a mobile environment. Firstly, DNN models require many computations because they consist of a large number of deep layers. Secondly, most of DNN architectures are designed with the purpose of improving accuracy, which inevitably involves the presence of unnecessary layers and features in making actual inferences, and the complexity of these architectures increase inference time. Thirdly, Float32 (single-precision type and double-precision type) is used in a resource-abundant environment, such as in a GPU server, whereas a half-precision type such as Float16 is used in a mobile environment so as to make efficient use of limited resources (for example, CPU, GPU, memory, etc.). Due to these resource differences, it is highly likely that an overflow may easily occur when a DNN model is used in a mobile environment.

In the present disclosure, there is provided a DNN optimization model suitable for a mobile environment, that allows a client in a mobile environment to perform real-time inference and provide a real-time preview of an effect (style transfer filter) applied to an image.

(1) one of the methods for optimizing a DNN model is to reduce the number of layers.

Figure 4:
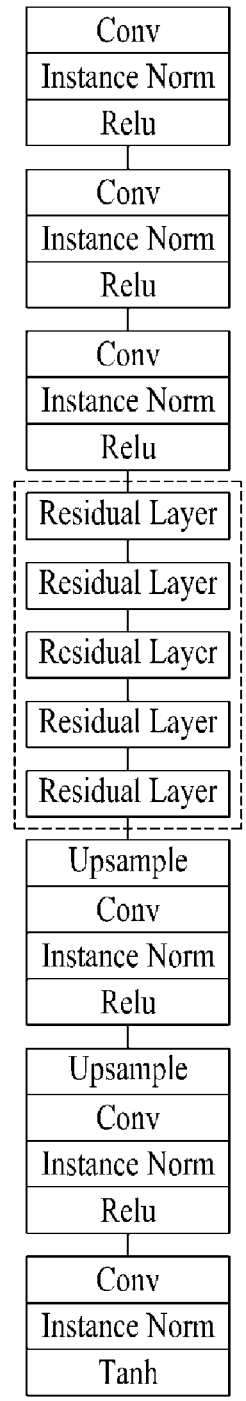
FIG. 4 is a diagram for illustrating an example of a DNN model optimization technique according to an exemplary embodiment of the present disclosure.
Figure 4:
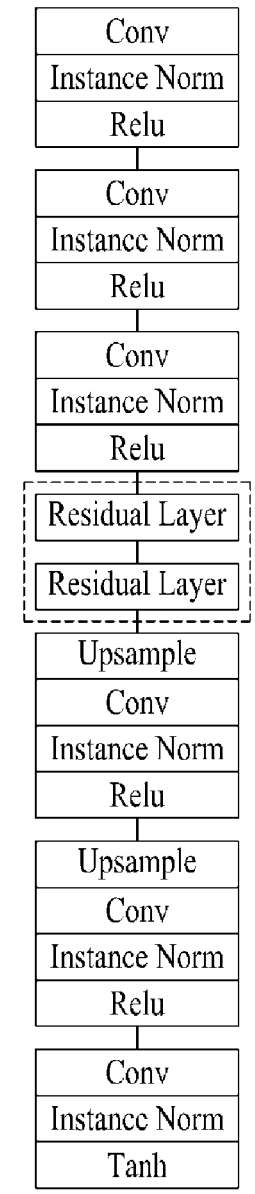

In accordance with one embodiment of the invention, the number of layers in a deep layer architecture may be reduced. Referring to FIG. 4, a DNN model may be optimized by reducing the number of residual layers. For example, a simple DNN model (student network) consisting of 14 layers may learn from a complex DNN model (i.e., teacher network) consisting of 32 layers through transfer learning. By employing transfer learning, even a simple model may achieve the same performance as a complex model. A residual layer is a network configuration of the residual learning method known in deep learning technology. For example, as described with reference to FIG. 8, the residual layer may consist of two convolution operators (Cony) and an activation function (Rectified Linear Unit (ReLU)). The residual learning method does not interfere with the gradient, and can implement deep network configuration while improving learning performance by refining the output of the layer consisting of residual connections.

Figure 5:
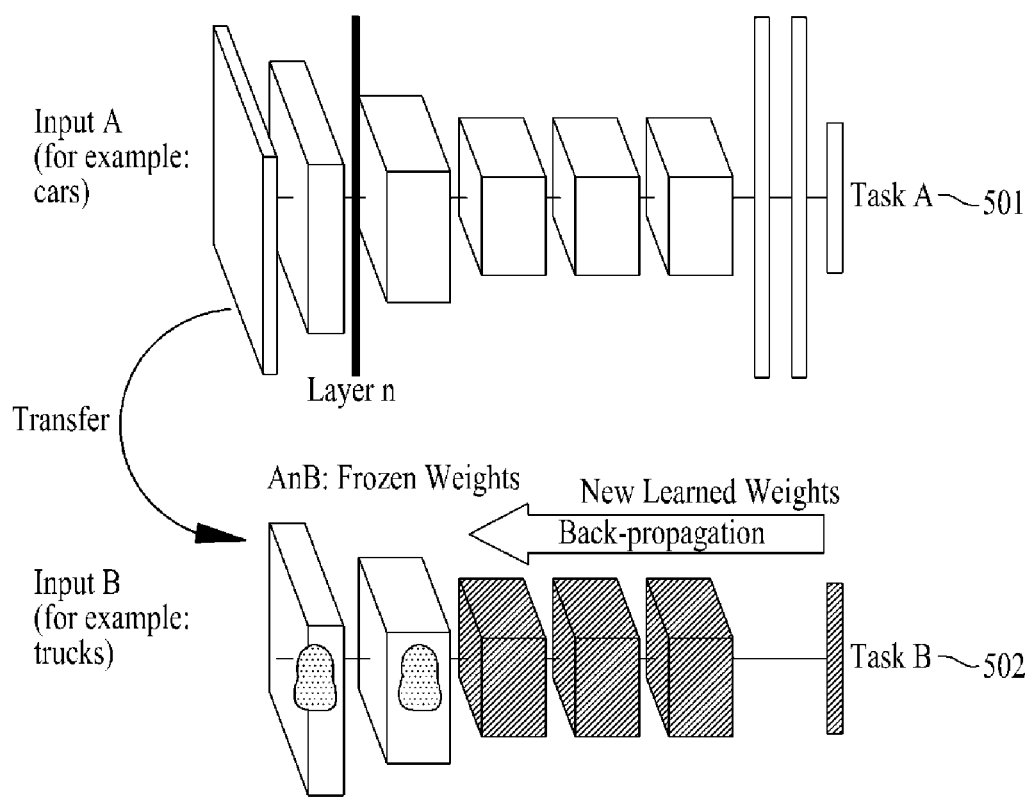
FIG. 5 is a diagram for illustrating an example of reducing the number of layers through transfer learning according to an exemplary embodiment of the present disclosure.
Figure 6:
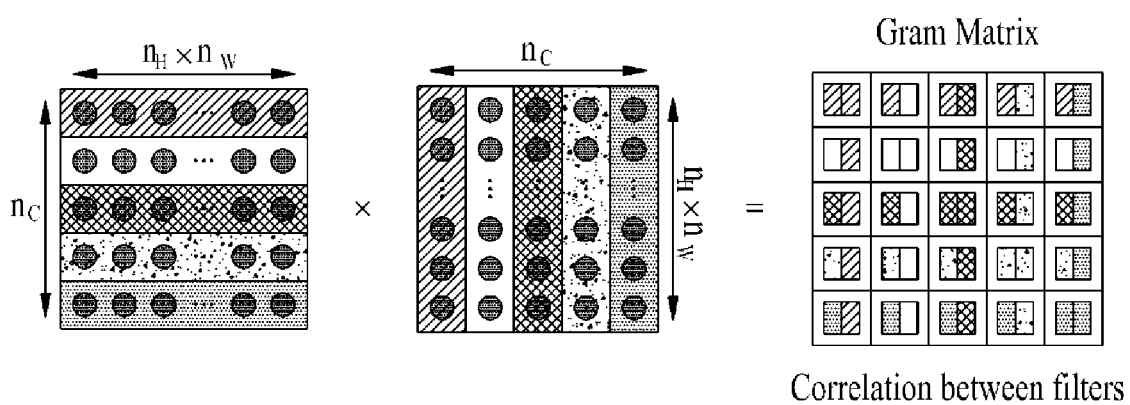
FIG. 6 is a diagram for illustrating an example of measuring similarities between images for the sake of transfer learning according to an exemplary embodiment of the present disclosure.

In another example, the similarities in style between a current DNN model to be trained and a list of previously trained DNN models are assessed and, if there is any similar model, transfer learning is performed on an intermediate learning result obtained from the previous DNN model. A DNN model for learning the style of an image for the sake of style transfer may be trained on an intermediate learning result obtained from a model that has been previously trained on a different style. There are DNN models having the same architecture for each style, and transfer learning may be performed based on a learning result obtained from a DNN model that has been trained on an image with a style similar to that to be learned. For example, as illustrated in FIG. 5, first two layers may be obtained from a previously trained Task A model 501 and configured as first two layers of a new Task B model 502 to be trained. To apply transfer learning, similarities between Task A and Task B need to be measured. In style transfer, when a DNN model learns a style image, the DNN model is trained based on the style of painting of the style image by using a gram matrix, as illustrated in FIG. 6. Using this learning method, the similarities between the style images of currently trained models may be measured. In style transfer, a VGG-19 pretrained network, which performs an image classification task well, may be used in order to obtain a gram matrix. A feature map derived from computational results of some layers of VGG-19 is used to produce a gram matrix. That is, the similarities between the two models may be measured by extracting a feature map from corresponding layers.

Accordingly, the present disclosure may implement a style transfer model optimized for a mobile environment by reducing the number of deep layers to be newly learned through transfer learning using different DNN models.

Figure 7:
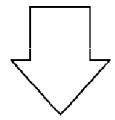
FIG. 7 depicts tables for illustrating another example of a DNN model optimization technique according to an exemplary embodiment of the present disclosure.

(2) Another method for optimizing a DNN model is to reduce the feature size, i.e., the kernels, the input channels and the output channels, of each layer (see FIG. 7).

In the present disclosure, the feature size of each layer may be reduced in a way that reduces the amount of computation and maintains high accuracy, depending on the task. There are studies that proved that, even if the feature size of each layer was reduced by half, the amount of accuracy loss was very little compared to existing models in which the total amount of computation (MACs) and parameters are reduced to about one-third and, on the contrary, some models achieved higher accuracy.

Accordingly, the present disclosure may implement a style transfer model optimized for a mobile environment by reducing the feature size of each layer constituting a DNN model.

(3) Yet another method for optimizing a DNN model is to form a residual layer with an architecture for avoiding an overflow.

Figure 8:
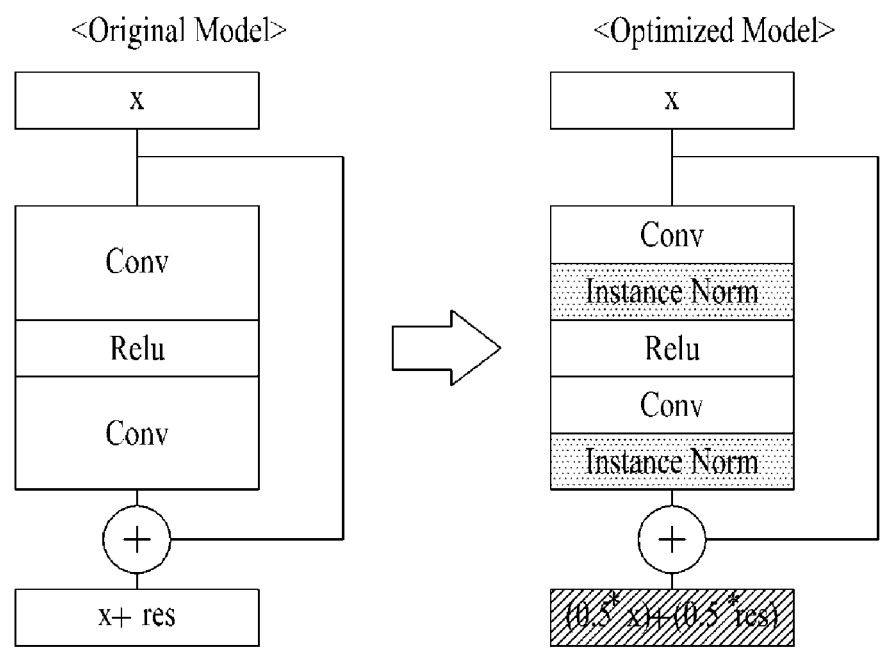
FIG. 8 depicts models for illustrating yet another example of a DNN model optimization technique according to an exemplary embodiment of the present disclosure.

Referring to FIG. 8, a residual layer of an existing model consists of two convolution operations (Cony) and an activation function (ReLU; rectified linear unit). When an operation is performed on the residual layer with the above architecture in a mobile environment, it is highly likely that an overflow may occur during two convolution operations, due to the limited range of representation of Float16. As known in the art, an overflow is a phenomenon in which data increases beyond a predetermined range during a computation process.

To solve this problem, an instance normalization operator (Instance Norm) may be added next to each of the convolution operators (Cony) to form the residual layer with a new architecture. In other words, the residual layer may consist of a convolution operator (Cony), an instance normalization operator (Instance Norm), an activation function (ReLU), a convolution operator (Cony), and an instance normalization operator (Instance Norm) in the order mentioned. Instance normalization is a normalization technique, which is a process in which the mean and variance of pixel values for each channel (RGB) of an output image resulting from the convolution operations of an input image x are obtained and then each pixel value minus the mean is divided by the variance.

The result of a convolution operation may be normalized to a value between 0 and 1 by adding an instance normalization operator. Also, when another convolution operation is performed on the previous normalization result, the result remains within the range of representation of Float16, unlike the architectures of the existing models.

Moreover, as opposed to the existing models in which the operation result (res) of the preceding layer is applied as it is to the last residual layer, in the present disclosure, the last residual layer may comprise an architecture for scaling down the resultant value. For example, in the last residual layer, the resultant value may be scaled by multiplying it by 0.5. Through scaling, it is possible to prevent an overflow that may occur in residual layers, and the residual layers may have smaller resultant values. This can reduce the relative influence of the residual layers from the point of view of the entire layer structure, thereby minimizing unstable portions.

Accordingly, the present disclosure may implement a style transfer model optimized for a mobile environment by adding a normalization operator to a residual layer of a DNN model and further including an architecture for scaling down the result of the residual layer.

As seen from above, according to the exemplary embodiments of the present disclosure, a style transfer model optimized to enable real-time inference in a mobile environment may be implemented by downscaling a DNN-based style transfer model in the above methods (1) to (3).

The above-described deep learning system may be implemented in the form of a combination of hardware components, software components and/or hardware components and software components. For example, the device and components described in the embodiments may be implemented using one or more general-purpose computers or special-purpose computers, for example, a processing device, a controller, an arithmetic logic unit (ALU), a digital signal processor, a microcomputer, a field programmable array (FPA), a programmable logic unit (PLU), a microprocessor or any other device capable of executing or responding to an instruction. A processing device may perform an operating system (OS) and one or more software applications executed on the OS. Furthermore, the processing device may access, store, manipulate, process, and generate data in response to the execution of software. For convenience of understanding, one processing device has been illustrated as being used, but a person having ordinary skill in the art may be aware that the processing device may include a plurality of processing elements and/or a plurality of types of processing elements. For example, the processing device may include a plurality of processors or a single processor and a single controller. Furthermore, other processing configurations, such as a parallel processor, are also possible.

Software may include a computer program, a code, an instruction or a combination of one or more of these and may configure a processor so that it operates as desired or may instruct the processor independently or collectively. The software and/or data may be embodied in a machine, component, physical device, virtual equipment or computer storage medium or device of any type in order to be interpreted by the processor or to provide an instruction or data to the processor. The software may be distributed to computer systems connected over a network and may be stored or executed in a distributed manner. The software and data may be stored in one or more computer-readable recording media.

The method according to the embodiment may be implemented in the form of a program instruction executable by various computer means and stored in a computer-readable recording medium. The computer-readable recording medium may store a program instruction, a data file, and a data structure solely or in combination. The medium may continue to store a program executable by a computer or may temporarily store the program for execution or download. Furthermore, the medium may be various recording means or storage means of a form in which one or a plurality of pieces of hardware has been combined. The medium is not limited to a medium directly connected to a computer system, but may be distributed over a network. Examples of the medium may be of the type configured to store program instructions, including magnetic media such as a hard disk, a floppy disk and a magnetic tape, optical media such as CD-ROM and a DVD, magneto-optical media such as a floptical disk, ROM, RAM, and flash memory. Furthermore, other examples of the medium may include an app store in which apps are distributed, a site in which other various pieces of software are supplied or distributed, and recording media and/or store media managed in a server.

As described above, although the embodiments have been described in connection with the limited embodiments and the drawings, those skilled in the art may modify and change the embodiments in various ways from the description. For example, proper results may be achieved although the above-described descriptions are performed in an order different from that of the described method, and/or the above-described elements, such as the system, configuration, device, and circuit, are coupled or combined in a form different from that of the described method or replaced or substituted with other elements or equivalents.

Therefore, other implementations, other embodiments, and equivalents to the claims are also within the scope of the following claims.

What is claimed is:

1. A system for optimizing a deep neural network (DNN) model, comprising:
at least one processor configured to execute computer-readable commands, the processor including,
a learning part for learning a deep neural network (DNN)-based style transfer model by using an image of a specific style to be learned,
wherein the style transfer model is a DNN model having an architecture in which the number of deep layers is reduced through transfer learning using a previously learned result and includes a plurality of layers of a previously trained DNN model that has learned an image of a style similar to the specific style,
wherein the previously trained DNN model is a selected DNN model from a list including a plurality of previously trained DNN models based on style similarities between the style transfer model to be trained and each of the plurality of previously trained DNN models and
wherein the plurality of previously trained DNN models are trained based on a style of painting of an image by using a gram matrix.

2. The system of claim 1, wherein the style transfer model is a DNN model having an architecture in which a feature size of at least one layer is reduced.

3. The system of claim 1, wherein the style transfer model is a DNN model having an architecture in which an instance normalization operator is added to a plurality of residual layers.

4. The system of claim 3, wherein each of the residual layers includes a first convolution operator, a first instance normalization operator, an activation function, a second convolution operator, and a second instance normalization operator, in order.

5. The system of claim 3, wherein a last residual layer of the plurality of residual layers comprises an architecture for scaling down a resultant value of an operation of a preceding layer.

6. The system of claim 1, wherein the at least one processor including the learning part is provided in a mobile electronic device.

7. The system of claim 6, wherein the at least one processor includes a half-precision type processor, and the plurality of previously trained DNN models are configured to operate on a single-precision type processor or a double-precision type processor.

8. A method, executed by a computer, for optimizing a deep neural network (DNN) model, comprising:
learning a deep neural network (DNN)-based style transfer model by using an image of a specific style to be learned; and
providing a resulting image by applying the specific style to an input image through the style transfer model,
wherein the style transfer model is a DNN model having an architecture in which the number of deep layers is reduced through transfer learning using a previously learned result and includes a plurality of layers of a previously trained DNN model that has learned an image of a style similar to the specific style,
wherein the previously trained DNN model is a selected DNN model from a list including a plurality of previously trained DNN models based on style similarities between the style transfer model to be trained and each of the plurality of previously trained DNN models, and
wherein the plurality of previously trained DNN models are trained based on a style of painting of an image by using a gram matrix.

9. The method of claim 8, wherein the style transfer model is a DNN model having an architecture in which a feature size of at least one layer is reduced.

10. The method of claim 8, wherein the style transfer model is a DNN model having an architecture in which an instance normalization operator is added to a plurality of residual layers.

11. The method of claim 10, wherein each of the residual layers includes a first convolution operator, a first instance normalization operator, an activation function, a second convolution operator, and a second instance normalization operator, in order.

12. The method of claim 10, wherein a last residual layer of the plurality of residual layers comprises an architecture for scaling down a resultant value of an operation of a preceding layer.

13. A computer-readable recording medium storing a program for instructing a computer to execute the method for optimizing a deep neural network model as defined in claim 8.

* * * * *